Figure 1:
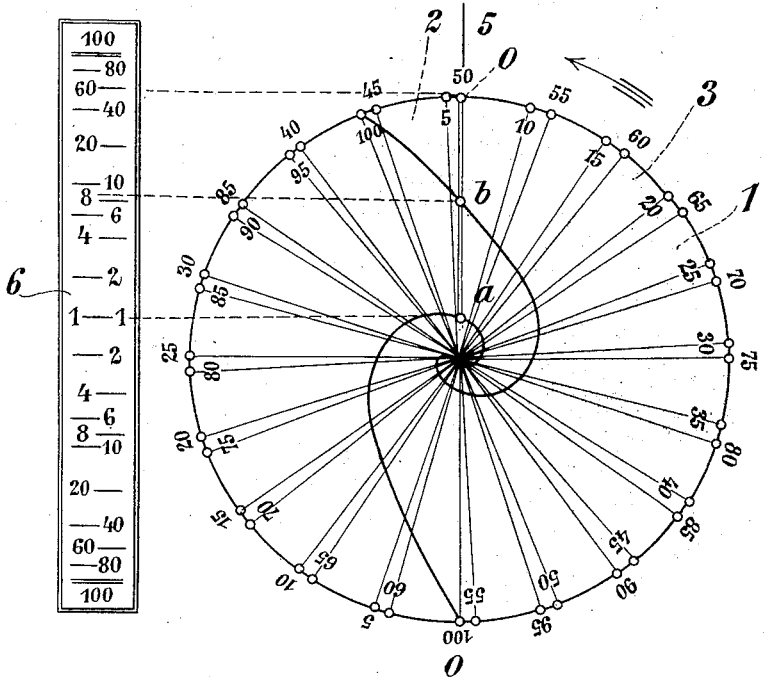

R. SCHISKE.
KILOMETER PER LITER REGISTER.
APPLICATION FILED MAY 6, 1922.

1,435,422.

Patented Nov. 14, 1922.

Inventor
R. Schiske,
By Marks Clerk
Attys.

Patented Nov. 14, 1922.

1,435,422

UNITED STATES PATENT OFFICE.

RUDOLF SCHISKE, OF VIENNA, AUSTRIA.

KILOMETER PER LITER REGISTER.

Application filed May 6, 1922. Serial No. 559,022.

*To all whom it may concern:*

Be it known that I, RUDOLF SCHISKE, citizen of the Austrian Republic, residing at Vienna, Austria, have invented certain new and useful Improvements in and Relating to Kilometers per Liter Register, of which the following is a specification.

This invention relates to an arrangement for motor-cars or the like for determining the amount of petrol consumed per kilometer or the number of kilometers travelled on a liter of petrol.

Thus it is intended to find the quotient of two variable values each of which is known.

In order that the quotient be automatically determined in simple manner it is necessary, that the arrangement gives the logarithms of two variable values (amount of petrol consumed and kilometers travelled) whose difference gives the logarithms of the quotient.

The ordinary speed indicators or petrolmeters state the values in a more or less linear and mostly empirically determined manner or scale, and therefore it is not possible to connect or couple this arrangement for instance to a slide-rule. The reason for this consists in that the scale of the speed indicator or petrolmeter and the slide-rule have to be divided according to different laws or rules.

According to the present invention the logarithm is determined for each value of the scale of the existing instrument, whereby a logarithmic curve is produced which in the case of a circular scale is of spiral shape.

Thereby it is immaterial whether the logarithm-values start from the centre or the periphery, as it is of necessity only that the curves of both scales are formed in like manner.

For instance if such curves are arranged above one another, points of intersection will result on a fixed line, which are nearer or farther away from one another according to the correlative position of the curves.

In the present case the length of the distance corresponds to the logarithm of the quotient.

Whilst up to now it has been possible to read-off an apparatus the momentary speed per hour and if desired on a second apparatus the momentary consumption of petrol per hour, the arrangement according to the present invention shows these two values in the exact proportion. Therefore it is possible to continuously check, whether the vehicle is travelling with the most economical speed, as it is only necessary to increase or decrease the speed until the apparatus will indicate a maximum number of kilometers per liter of petrol or a minimum number of liters of petrol consumed per kilometer.

It is obvious, that by travelling with the most favourable speed the utmost radius of action of the vehicle is attainable with the amount of petrol at disposal, e. g., with the smallest amount of petrol the largest possible number of kilometers can be travelled with the vehicle.

On the drawings:—

Figure 2:
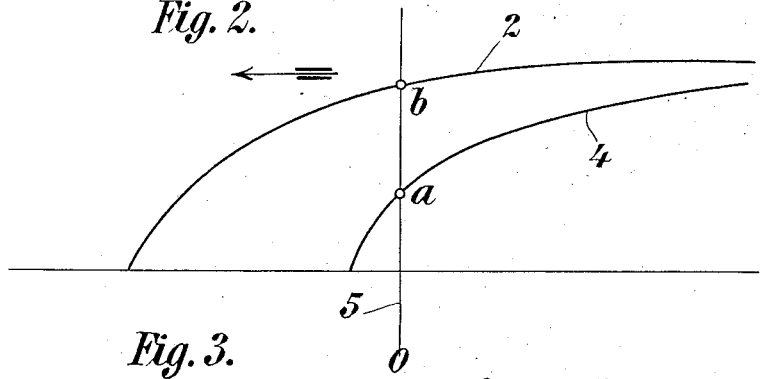
Figure 3:
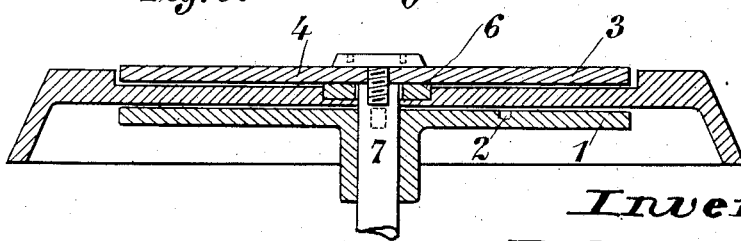

Figs. 1 and 2 show diagrams of an arrangement according to the present invention, and Fig. 3 is a cross-sectional view of the arrangement illustrated in Fig. 1.

A rotatable disc 1 is connected to the arrangement for indicating the consumption of fuel per hour, the values of the scale being arranged at the circumference of the disc, whilst the corresponding logarithmic values are located radially with respect to the periphery of the disc. By this arrangement a logarithmic curve 2 for reading the values is formed on the disc.

A second disc 3, provided with the kilometer-scale and consisting of transparent material, is mounted on the disc 1, the said disc 3 being provided preferably at its underside (in order to prevent incorrectness owing to the thickness of the material) with the corresponding logarithmic curve 4 of its scale.

A fixed pointer 5 for indicating the zero position is preferably mounted between the discs 1 and 3.

In the illustrated case, the mark 50 on the disc 3 for indicating the kilometers is in line with the pointer 5 and thus indicates that the vehicle is travelling at a speed of 50 kilometers per hour.

The curve 4 transects the pointer at $a$.

The disc 1 indicates that six liters of fuel are being used per hour.

The curve 2 transects the pointer 5 at $b$. Therefore the distance $a—b$ is the logarithm of the quotients of the two scale-values, as the distance $a—b$ is like the difference of the logarithms $o—a$ and $o—b$.

The part of the logarithmic distance cutoff on the pointer by the two curves will generally indicate the proportional number. However in some cases it may be desirable to know the exact value with respect to one kilometer or one liter.

A rule 6 serves for this object. Preferably the rule is slidably arranged between the discs and is adjustable either by hand or automatically from its zero position to one of the points of transection $a$ or $b$ between the curves and the pointer for allowing to read-off either the kilometers per liter of fuel or the liters per kilometer travelled.

If the arrangements for indicating the speed or the consumption of fuel cause rectilinear shiftings, slides with logarithmic curves are employed instead of rotary discs, which are rectilineally adjusted against one another. Fig. 2 illustrates such an embodiment diagrammatically.

The described arrangements are based on the logarithmic system. However the same object may be attained with trigonometrical or other systems of function for transforming the scale values.

The present arrangement may be used for indicating the consumption of fuel per horse-power or the like by apparatus provided with suitable curves.

Having thus described my invention, what I claim as new and desire to secure by Letters-Patent is:—

1. A device for determining the amount of fuel consumed per kilometer or the number of kilometers travelled per liter of fuel, comprising two curves which are adjustable with respect to one another and reproduce these two variable values in auxiliary functions one of the said curves being adjusted by the fuel-meter and the other curve by the speed indicator, a fixed zero indicator intersected at all times by said curves, and a scale cooperating with said curves and zero indicator and calibrated in kilometers and liters whereby the points of intersections of both curves indicate on the scale the present value of the two variable values and the relative position of both points of intersection with respect to one another indicate the present correlative proportion of the two variables.

2. A device for determining the amount of fuel consumed per kilometer or the number of kilometers traveled per liter of fuel comprising a pair of superposed rotatable disks, one of which is transparent, one of said disks being radially divided to indicate the distance traveled per hour and being adapted to be driven by speed responsive mechanism, the other disk being radially divided to indicate fuel consumption, each of said disks being provided with a logarithmic curve extending from its center to its periphery, a fixed zero indicator cooperating with said disks and adapted to intersect said curves at all times, and a scale cooperating with said curves and calibrated in kilometers and liters.

In testimony whereof I affix my signature in presence of two witnesses.

RUDOLF SCHISKE.

Witnesses:
 CARL CONDENKORG,
 JÜRG AVG MORANTSCHITSKY.